United States Patent
Desai

(10) Patent No.: US 12,541,384 B2
(45) Date of Patent: Feb. 3, 2026

(54) COMPONENT TESTING FRAMEWORK

(71) Applicant: Sophos Limited, Abingdon (GB)

(72) Inventor: Jaydatt Jitendriya Desai, Gujarat (IN)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 18/114,101

(22) Filed: Feb. 24, 2023

(65) Prior Publication Data
US 2024/0289264 A1    Aug. 29, 2024

(51) Int. Cl.
| | | |
|---|---|---|
| G06F 8/76 | (2018.01) | |
| G06F 8/61 | (2018.01) | |
| G06F 9/455 | (2018.01) | |
| G06F 11/3668 | (2025.01) | |
| G06F 9/445 | (2018.01) | |
| G06F 21/54 | (2013.01) | |
| G06F 21/55 | (2013.01) | |
| H04L 9/40 | (2022.01) | |
| H04L 45/645 | (2022.01) | |

(52) U.S. Cl.
CPC ............... *G06F 9/455* (2013.01); *G06F 8/61* (2013.01); *G06F 8/76* (2013.01); *G06F 11/3692* (2013.01); *G06F 11/3696* (2013.01); *G06F 9/44505* (2013.01); *G06F 21/54* (2013.01); *G06F 21/55* (2013.01); *H04L 45/645* (2022.05); *H04L 63/102* (2013.01)

(58) Field of Classification Search
CPC .. G06F 11/3696; G06F 11/3592; G06F 21/55; G06F 21/54; G06F 8/61; G06F 8/76; G06F 9/44505; G06F 9/455; H04L 63/102; H04L 45/645; H04L 41/0213
See application file for complete search history.

(56) References Cited

U.S. PATENT DOCUMENTS

| | | | |
|---|---|---|---|
| 2018/0026984 A1* | 1/2018 | Maker | H04L 63/102 726/4 |
| 2018/0365008 A1* | 12/2018 | Chandramouli | G06F 8/76 |
| 2019/0156199 A1* | 5/2019 | Reeve | G06F 11/3696 |
| 2022/0123999 A1* | 4/2022 | Bar Oz | H04L 41/0213 |
| 2022/0210181 A1* | 6/2022 | Hawthorn | G06F 21/55 |
| 2022/0247678 A1* | 8/2022 | Atwal | H04L 45/645 |
| 2024/0143468 A1* | 5/2024 | Michael | G06F 9/44505 |
| 2024/0220616 A1* | 7/2024 | Benameur | G06F 21/54 |

* cited by examiner

*Primary Examiner* — Tuan A Vu
(74) *Attorney, Agent, or Firm* — Strategic Patents, P.C.

(57) ABSTRACT

A mock server is configured to mimic the operation of one or more microservices used in enterprise software. When a new microservice is completed for use in the enterprise software, the new microservice and the mock server can be deployed in a pre-production environment for testing. One or more test cases are created and then executed in the pre-production environment, causing the new microservice to access various other microservices represented by the mock server with one or more predetermined requests. In this manner, the new microservice may be tested in a simulated production environment before other microservices in the enterprise software design have been fully implemented.

20 Claims, 10 Drawing Sheets

COMPONENT TESTING FRAMEWORK

BACKGROUND

Enterprise software may require regular testing for functionality, security, or both. Against this backdrop, there remains a need for improved techniques for testing enterprise solutions in a manner that efficiently responds to evolving user needs, policy requirements, and security environments.

SUMMARY

A mock server is configured to mimic the operation of one or more microservices used in enterprise software. When a new microservice is completed for use in the enterprise software, the new microservice and the mock server can be deployed in a pre-production environment for testing. One or more test cases are created and then executed in the pre-production environment, causing the new microservice to access various other microservices represented by the mock server with one or more predetermined requests. In this manner, the new microservice may be tested in a simulated production environment before other microservices in the enterprise software design have been fully implemented.

In an aspect, a computer program product disclosed herein may include computer executable code embodied in a non-transitory computer readable medium that, when executing on one or more computing devices, causes the one or more computing devices to perform the steps of instantiating a first microservice in a pre-production environment, the first microservice configured for use with a second microservice in the pre-production environment, the pre-production environment including a cloud computing platform, instantiating a mock server for the second microservice in the pre-production environment, the mock server configured to mimic operation of one or more microservices including the second microservice by providing one or more predetermined responses to one or more predetermined requests in place of programming logic for the second microservice when deployed in the pre-production environment, creating one or more test cases as a script executable in the pre-production environment to cause the first microservice to access the mock server with the one or more predetermined requests, testing operation of the first microservice in the pre-production environment using the script to communicate one or more requests to the first microservice based on the test cases that invoke the one or more predetermined requests to the second microservice, monitoring the pre-production environment for receipt of the one or more predetermined responses by the first microservice, and deploying the first microservice and the second microservice in a production environment.

Implementations may include one or more of the following features. The production environment may include a container orchestration service for deploying a plurality of containerized computing objects as a network-accessible application. The second microservice may include a login service configured to validate user credentials, and the mock server may include a second one or more predetermined responses to a login request including at least an authorization response for predetermined login credentials and an authorization rejection for login credentials other than the predetermined login credentials.

In another aspect, a method disclosed herein may include: instantiating executable code for a first microservice in a pre-production environment, the first microservice configured for use with a second microservice in the pre-production environment, instantiating a mock server for the second microservice in the pre-production environment, the mock server configured to mimic operation of one or more microservices including the second microservice by providing one or more predetermined responses to one or more predetermined requests in place of programming logic for the second microservice when deployed in the pre-production environment, testing operation of the first microservice using one or more requests to the first microservice that invoke the one or more predetermined requests to the second microservice, and monitoring the pre-production environment for receipt of the one or more predetermined responses from the mock server by the first microservice.

Implementations may include one or more of the following features. The pre-production environment may include a heterogenous computing environment. The pre-production environment may include a distributed computing environment. The pre-production environment may include a cloud computing platform. The pre-production environment may include a plurality of programming interfaces. The pre-production environment may include a container orchestration service for deploying a plurality of containerized computing objects as a network-accessible application. The container orchestration service may use a lightweight implementation of Kubernetes as a container orchestration platform. The second microservice may include a login service configured to validate user credentials, and the mock server may include a second one or more predetermined responses to a login request including at least an authorization response for predetermined login credentials and an authorization rejection for login credentials other than the predetermined login credentials. The second microservice may include a gateway service configured to manage authentication of users for access to a web application for an enterprise network, and the mock server may include a second one or more predetermined responses to an authentication request including at least an authentication token for granting access to the web application. The second microservice may include a database service configured to access a database, and the mock server may include a second one or more predetermined responses to a plurality of predetermined database queries. The second microservice may include a threat management service configured to manage threats to an enterprise network, and the mock server may provide at least one predetermined response to security services request. The method may further include creating one or more test cases that cause the first microservice to access the mock server with the predetermined requests and instantiating the one or more test cases in the pre-production environment as a script executable in the pre-production environment to present the one or more requests to the first microservice that invoke the one or more predetermined requests from the first microservice to the second microservice. The method may further include logging use of the mock server with instrumentation deployed in the pre-production environment. The method may further include revising the one or more test cases, thereby providing an updated test case, creating one or more additional predetermined responses to one or more additional predetermined requests based on the updated test case, modifying the mock server to mimic operation of the second microservice based on the one or more additional predetermined requests and responses, thereby providing a modified mock server, and instantiating the updated test case and the modified mock server in the pre-production environment.

In another aspect, a system disclosed herein may include a computing platform. The computing platform may be configured to execute a microservice and one or more mock servers in a pre-production environment. The microservice may be configured for use with one or more additional microservices in the pre-production environment as an application. The one or more mock servers may be configured to mimic operations of the one or more additional microservices by providing predetermined responses to predetermined requests in place of programming logic for the one or more additional microservices when executing in the pre-production environment. The computing platform may be configured to receive executable code for the microservice and the one or more mock servers from a remote integrated design environment, execute the executable code for the microservice and the mock servers for the additional microservices in the pre-production environment, and test operation of the microservice using at least one test case that causes the microservice to initiate one or more of the predetermined requests to the additional microservices.

Implementations may include one or more of the following features. The computing platform may be a cluster of computing instances. Each computing instance may be a virtual computing instance.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DESCRIPTION

Figure 1:
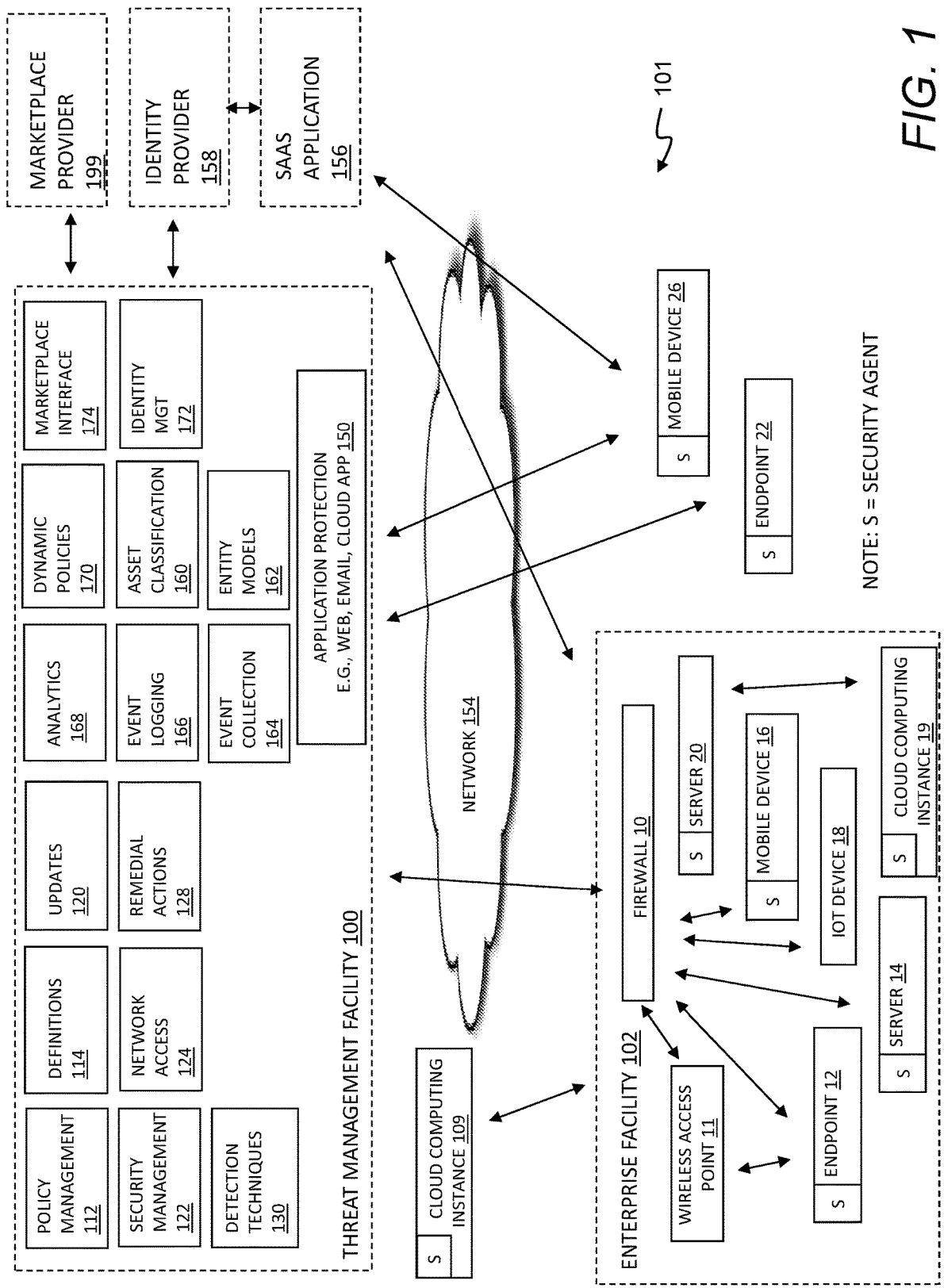
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also or instead be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of physical or logical location in a network environment, unless a different meaning is explicitly provided or otherwise clear from the context.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
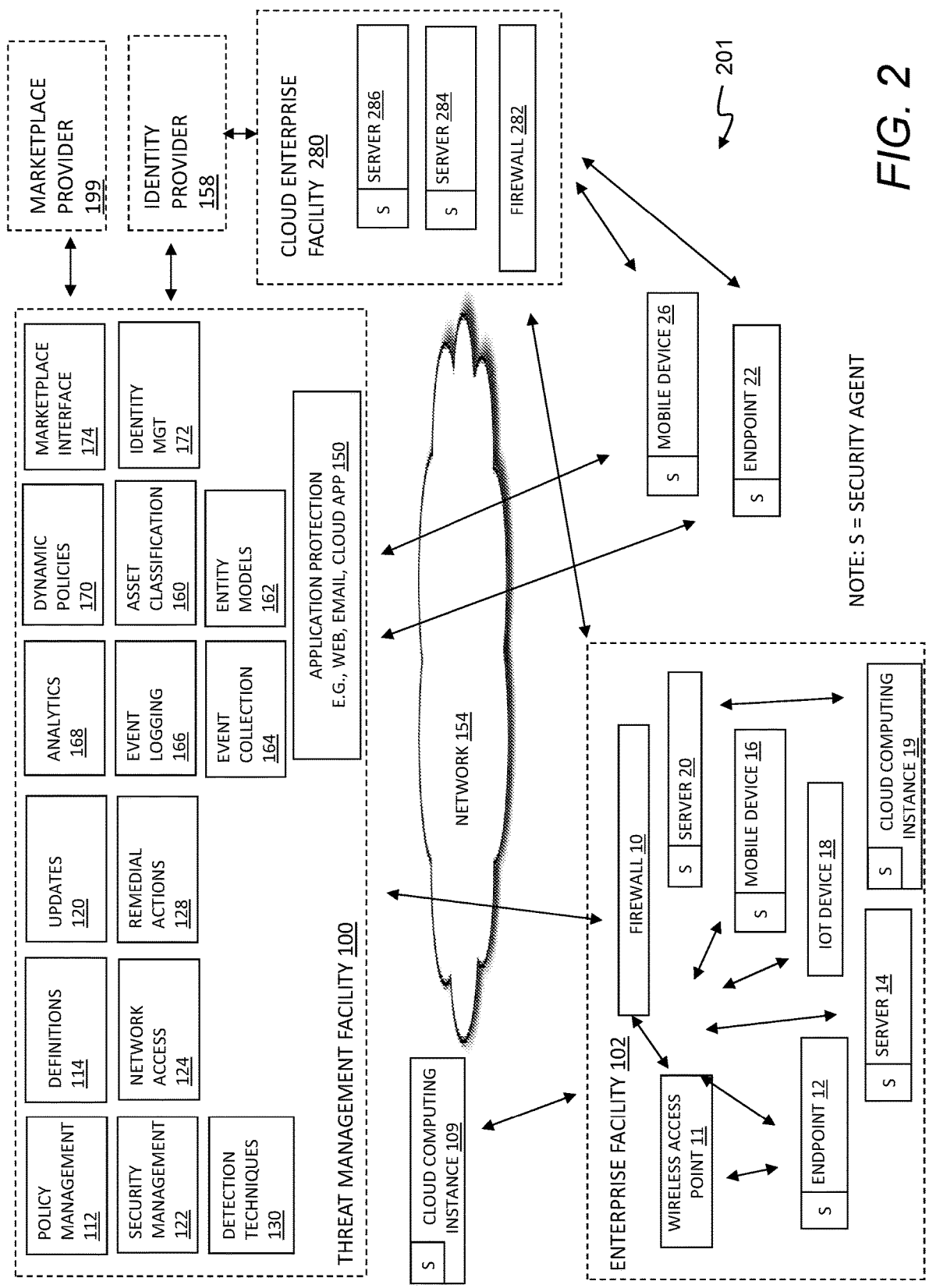
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
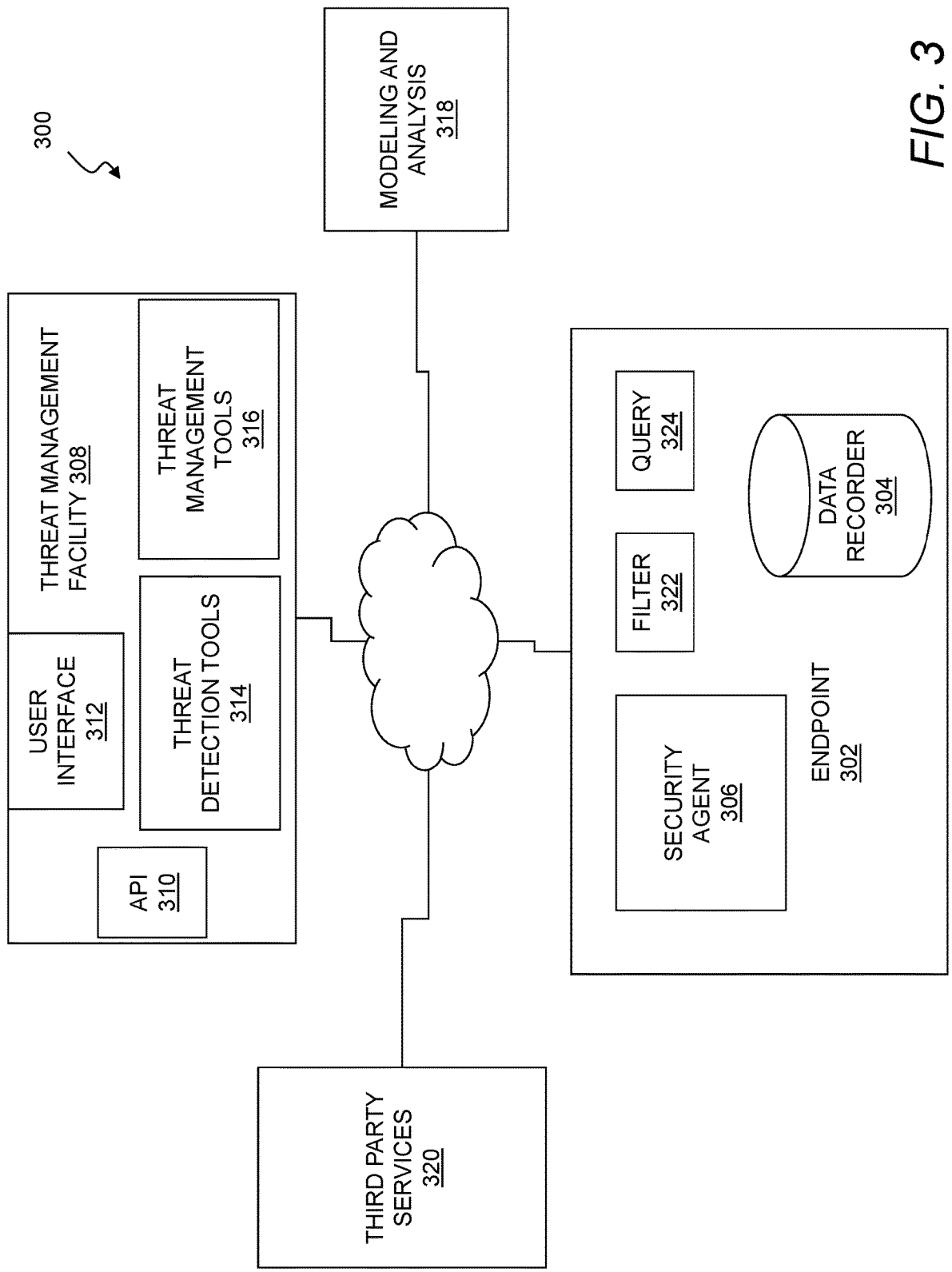
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream, and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be request for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
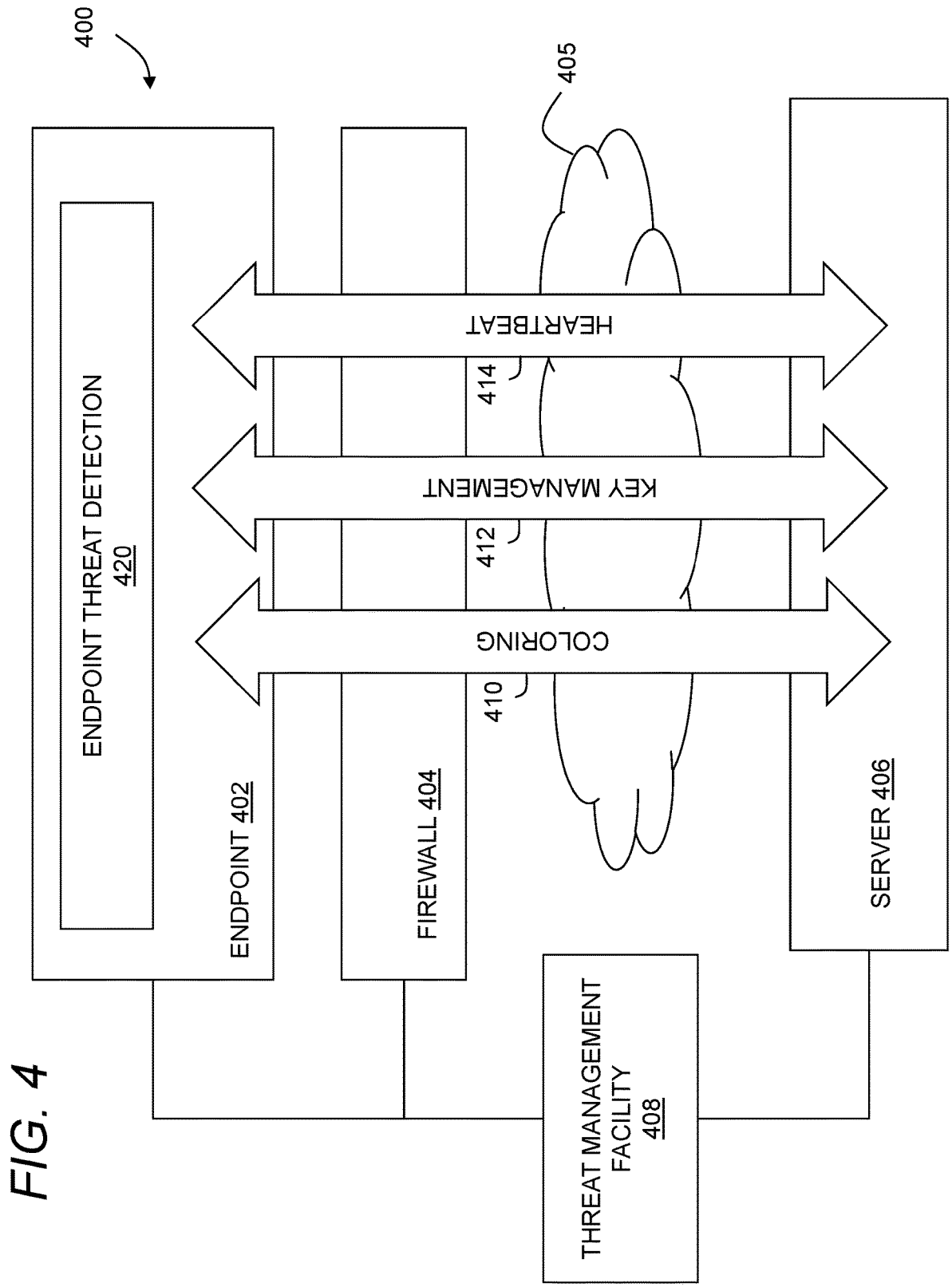
FIG. 4 illustrates a threat management system.

FIG. 4 illustrates a threat management system. In general, the system 400, which may be any of the enterprise networks and/or other networks or systems described herein, may include an endpoint 402, a firewall 404, a server 406 and a threat management facility 408 coupled to one another directly or indirectly through a data network 405, all as generally described above with reference to FIGS. 1-3. Each of the entities depicted in FIG. 4 may, for example, be implemented on one or more computing devices such as the computing devices described herein. A number of systems and subsystems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

Figure 5:
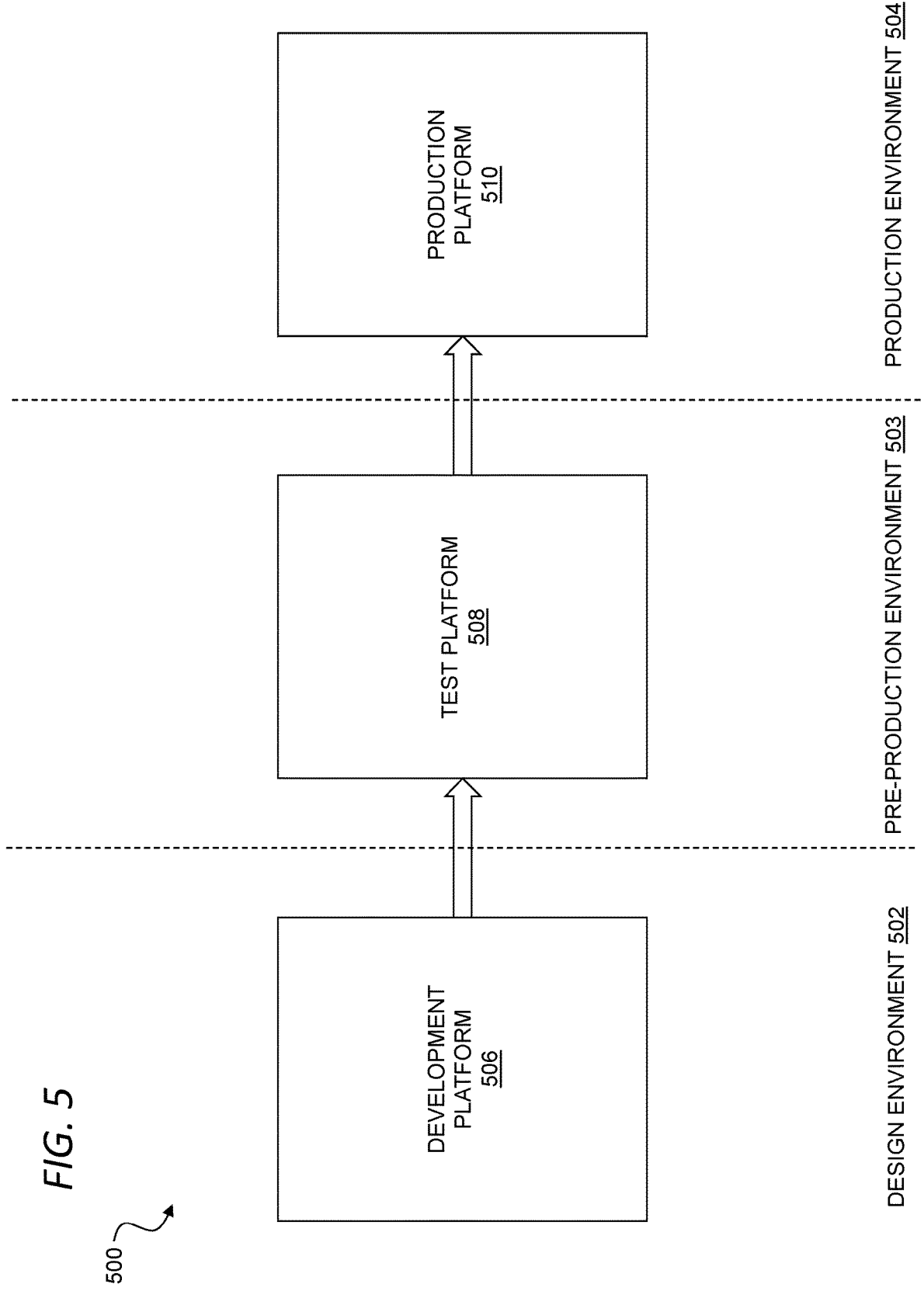
FIG. 5 illustrates an environment for developing, testing, and deploying a microservice.

FIG. 5 illustrates an environment for developing, testing, and deploying a microservice. The environment 500 may include one or more environments for building and deploying enterprise software as a microservice architecture. This may, for example, include a design environment 502, a pre-production environment 503, and a production environment 504. In one aspect, the environment 500 may include a continuously integrated development environment providing tools for a development operations team or other design team to build, test, package, and deploy applications for enterprise users or the like. The environment 500 may, for example, include any commercially available or proprietary continuous integration and delivery ("CI/CD") tools, or other tools, platforms, resources, and the like to aid in manual and/or automated design and deployment of enterprise applications. Modern integrated development tools will typically include a variety of resources that support consistent integration of building, packaging and testing applications in order to facilitate frequent code changes to a (potentially complex) code base for an enterprise application. According to contemporary CI/CD principles, the environment 500 may also support automated delivery to development and testing environments, as well as storage of environment-specific parameters required by a customer. A CI/CD automation platform may also coordinate any necessary calls to services, web servers, databases, and so forth, that might require restarting or other action with each new code deployment.

The design environment 502 may include a development platform 506 containing any combination of physical devices, virtual devices, cloud resources, and the like used for developing enterprise applications using microservices. The design environment 502 may be an integrated development environment, or any other suitable environment or combination of environments suitable for creating and testing microservice architectures and the like. The development platform 506 may include tools for coding, testing, and debugging individual microservices before releasing them to the pre-production environment 503. Thus, unit testing—testing of a particular microservice—and the like may be performed in the design environment 502.

The pre-production environment 503 may include a test platform 508 containing any combination of physical devices, virtual devices, cloud resources, and the like used for testing enterprise applications using a microservice architecture or the like. The pre-production environment 503 may be an isolated environment separate from the design environment 502 and the production environment 504. In some embodiments, the test platform 508 may execute one or more mock servers for testing a microservice.

In general, a mock server, as used herein, refers to any server deployable in the pre-production environment 503 and configured to mimic operation of one or more microservices in an enterprise application by providing one or more predetermined responses to one or more predetermined requests in place of programming logic for the corresponding microservices. While the mock server may be configured as a microservice, the mock server is distinguishable from other microservices in a number of ways. For example, while a microservice is generally dynamic in nature, and will execute incoming requests according to business logic coded into the microservice, the mock server contains no dynamic coding or business logic for processing requests. Instead, the mock server contains a static catalog of requests and corresponding responses that are generally configured to mimic the behavior of other microservices in an enterprise application. Furthermore, while a microservice may depend, when executing business logic, on other microservices, the mock server will typically be self-contained, and will contain no dependencies on other microservices. Thus, for example, where a microservice may rely on other microservices for authentication, data lookups, storage, specialized data processing, access to external resources, and so forth, the microservice will contain no such dependencies on other resources. In one aspect, a mock server may be configured with one or more synthetic delays to simulate latency in other microservices and resources. In another aspect, the mock server may contain internal tools, separate from the statically coded microservice request/response engine described above, for logging and reporting interactions with one or more microservices that are using the mock server for testing. According to the foregoing, a mock server for use in testing as described herein may be a self-contained, static, deterministic server with no dependencies that mimics the aggregated interface of a plurality of other microservices in a microservice architecture for an enterprise application. In this manner, the test platform 508 may test a microservice designed for the enterprise application in isolation within the pre-production environment 503 without the need for fully functioning or verified instances of other microservices for the enterprise application.

In general, a mock server, as used in the pre-production environment described herein, may mimic the functions of a group of one or more microservices (and other resources) in a microservices architecture for an enterprise application. In one aspect, the mock server may be configured to emulate a set of microservices that are used by an isolated microservice so that the isolated microservice can be tested in the context of the complete enterprise application. This technique advantageously facilitates testing of the isolated microservice, or a sub-group of microservices, before other microservices within the microservices architecture have been fully coded and/or tested.

The production environment 504 may include a production platform 510 containing any combination of physical devices, virtual devices, cloud resources, and the like used for deploying microservices. The production environment 504 may host an enterprise application for end users. Thus, the production environment 504 may include network connectivity facilitating remote access to the enterprise application, once deployed therein, for use, e.g., by enterprise users or, where appropriate, the general public. This may include a web server, application gateway, virtual private network access point, or other access point exposed to a data network such as the Internet or an internal data network at a customer premises and available for network access. The production platform 510 may execute an enterprise application composed of one or more microservices in communication with each other after the microservices have been tested in the pre-production environment 503. In one aspect, the production environment 504 may include a threat management facility such as any of the threat management facilities described herein, and the enterprise application may include a security application or other application or service hosted in whole or in part at the threat management facility.

In general, the term microservice, as used herein, is intended to refer to any independently deployable service that can communicate with other services to form an enterprise application. Each microservice may, for example be a small, independent service responsible for a specific function that can be developed, deployed, and managed independently from other microservices and enterprise resources. Each microservice will typically have a well-defined Application Programming Interface (API) and use a lightweight protocol such as HyperText Transfer Protocol ("HTTP")for communications. A microservice architecture supports independently deployable and loosely coupled services that can be organized around particular business functions. As a significant advantage, these microservices are generally highly maintainable and testable as individual units of code. However, they do not generally provide an infrastructure for debugging or troubleshooting when an error occurs within a large collection of interacting microservices in an enterprise application or the like. Thus, for example, when there are many microservices (e.g., one-hundred or more) in a cluster, and the cluster of microservices does not behave as expected, it can be difficult to determine what microservice or combination of microservices causes the misbehavior.

Figure 6:
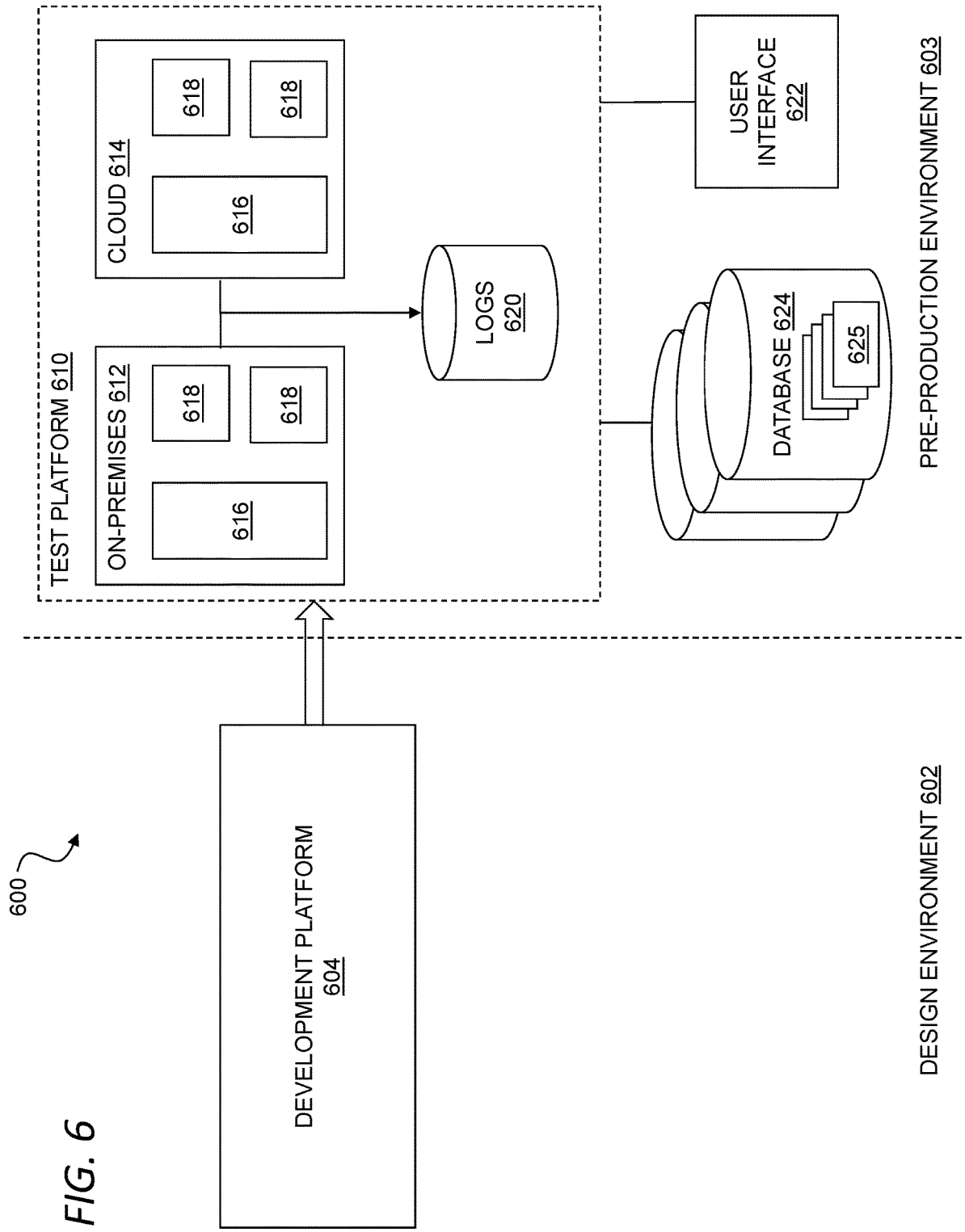
FIG. 6 illustrates an environment for developing and testing a microservice.

FIG. 6 illustrates an environment for developing and testing a microservice. In general, the environment 600 may include a design environment 602 such as an integrated design environment or the like where a microservice may be developed and unit tested (e.g., as a stand-alone software unit). In general, the microservice may be a component of a larger enterprise application being developed and tested, and the environment 600 may include a pre-production environment 603 where the microservice may be tested for use in combination with other microservices and resources that form the enterprise application.

The design environment 602 may generally include a development platform 604 with any suitable combination of development tools, integrated development environments, testing software, code libraries, and so forth. More generally, the development platform 604 may include any suitable arrangement of resources for developing individual code units and/or enterprise applications.

The pre-production environment 603 may include a test platform 610 containing any combination of physical devices, virtual devices, cloud resources, and the like used for testing microservices, or more specifically, collections of microservices in a microservice architecture configured to provide an enterprise application or the like. The pre-production environment 603 may, for example, include an on-premises deployment 612 of microservices, a cloud deployment 614 of microservices, or some combination of these and/or other network-accessible computing resources.

For example, an on-premises deployment 612 of the test platform 610 may include any number of network devices (e.g., gateways, firewalls, access points, switches, and so forth), any number of computing devices (e.g., desktop computers, laptop computers, tablets, mobile devices, and so forth), and any number of servers (e.g., for applications, databases, enterprise content, electronic mail and messaging, and so forth) or the like the form, or that emulate, a customer's on premises infrastructure where an enterprise application is to be deployed. For these deployments, an enterprise may use self-hosted runners executing on computing resources within the enterprise premises.

The cloud deployment 614 may include any combination of generic or special purpose cloud computing resources such as a cloud computing platform provided by Google™ Cloud, Amazon™ Web Services (AWS™), Microsoft™ Azure™, and so forth. The cloud deployment 614 may also or instead include any cloud computing infrastructure, e.g., for scalable applications, which may be hosted on any of the foregoing, or independently deployed and managed by an enterprise. For example, this may include an open-source platform such as Kubernetes or the like for automating deployment, scaling, and management of containerized applications such as a microservice architecture for an enterprise application. An enterprise application may also or instead include Software as a Service (SaaS) resources, Zero Trust Network Applications, remote databases, and other remotely hosted or managed applications. As an advantage, an application designed using the techniques described herein may be seamlessly deployed across any one or more of these resources.

The on-premises deployment 612 and/or the cloud deployment 614 may deploy a microservice 616 and one or more mock servers 618 for testing. The microservice 616 and the mock servers 618 may be any of the microservices and mock servers described herein. The operation of the microservice 616 may be tested at the on-premises deployment 612 and/or the cloud deployment 614. Testing the microservice 616 may output one or more log files that may be stored at a log database 620. The log files may be automatically deleted after a predetermined retention period for an enterprise. The log files may be accessed at a user interface 622 for the pre-production environment 603 (e.g., at the mock server(s) 618, or at a separate logging resource for the mock server(s)). The user interface 622 may include options for debugging the mock servers 618 and/or the microservice 616.

The pre-production environment 603 may also include one or more databases 624 that store, e.g., mock server files 625 and other testing patterns and data. The mock server files 625 may configure the mock servers 618 to mimic operation of other microservices in a microservice architecture for an enterprise application or the like. Each mock server file 625 may include one or more predetermined responses, one or more predetermined requests, and one or more request matchers that match requests to responses in order to define a configuration for a mock server 618. The databases 624 may include any number of suitable storage devices such as disk drives, flash memory or any other optical, electromagnetic, magnetic, infrared, or other device or combination of devices.

Figure 7:
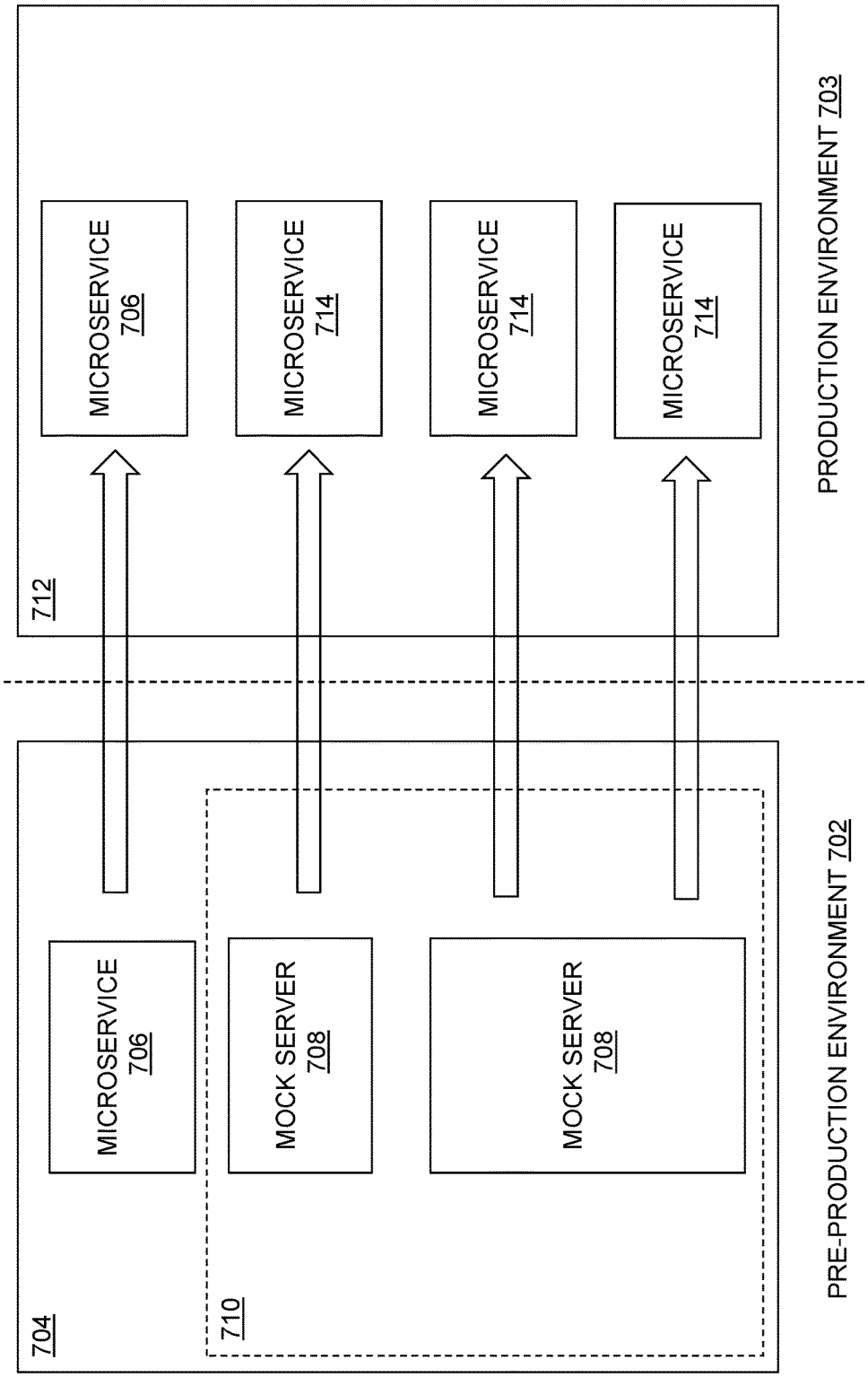
FIG. 7 illustrates an environment for deploying and testing a microservice.

FIG. 7 illustrates an environment for deploying and testing a microservice. The environment 700 may include a pre-production environment 702 where an enterprise application may be tested, and a production environment 703 where the enterprise application may be deployed for use.

The pre-production environment 702 may include a computing platform 704, such as the on-premises deployment 612 or cloud deployment 614 in FIG. 6. The computing platform 704 may execute a microservice 706 and one or more mock servers 708, e.g., as containers or the like in the pre-production environment 702. By deploying one of the microservices 706 as a container, the microservice 706 may more easily be ported to different production environments after validation. The microservice 706 and the one or more mock servers 708 may be developed individually within a design environment, such as design environment 602 in FIG. 6, before being tested collectively in the pre-production environment 702. Each mock server 708 may mimic the operation of one or more microservices that communicate with the microservice 706 to form an enterprise application. The mock servers 708 may execute on a computing cluster 710 within the pre-production environment 702. In some embodiments, the computing cluster 710 may include a cluster of computing instances, such as a cluster of Kubernetes nodes or other remotely manageable, cloud-based platform for deploying software in containerized services or the like.

In some embodiments, the computing platform 704 may execute additional microservices that communicate with microservice 706 and the mock servers 708 without being mimicked by mock servers. More generally, a particular test instance may use any number and arrangement of mock servers and microservices. For example, where two or more microservices in a microservice architecture have been completely unit-tested (and then optionally individually tested with mock servers in the pre-production environment 702), these two or more microservices may be deployed together in the pre-production environment 702, provided that all of the endpoint URL's (or other addresses used by microservices to access other microservices in a computing environment) are properly configured in a non-conflicting manner, and the mock server is correctly configured to respond with external access to the deployed microservices where appropriate for testing. Similarly, two or more mock servers may be used. For example, for a complex application, two or more mock servers may be deployed for different functional categories, interface categories (e.g., internal v. external resources for the enterprise network), application categories (e.g., according to third-party software resources or data), user types (e.g., user v. administrative user), and so forth, to facilitate staged testing for corresponding groups of microservices.

The production environment 703 may include a computing platform 712 such as any of the computing platforms described herein. The computing platform 712 may, for example, include any number of network devices (e.g., gateways, firewalls, access points, switches, and so forth), any number of computing devices (e.g., desktop computers, laptop computers, tablets, mobile devices, and so forth), any number of servers, any number of cloud computing resources, and the like. During testing, each of the additional microservices 714 may be mimicked by a mock server 708 within the pre-production environment 702, in order to independently verify operation of the microservice 706 free from dependency on the proper behavior of other microservices in the pre-production environment 702. After testing of individual microservices (or groups of microservices) in the pre-production environment 702, the mock server(s) 708 may be replaced with the corresponding microservices 714 and deployed collectively as an enterprise application in the production environment 703, where end users can access and use the enterprise application. The computing platform 712 may generally execute the microservices 706, 714 within the production environment 703, where the microservices 706, 714 can function together to provide the intended functions of the enterprise application.

In some embodiments, the production environment 703 may include a cloud-based zero trust network access environment such as any of the enterprise networks and supporting security and cloud-based infrastructure described in U.S. application Ser. No. 18/089,930, the entire content of which is hereby incorporated by reference. In some embodiments, the production environment 703 may include a threat management facility (e.g., threat management facility 100 in FIG. 1) for providing protection against a plurality of security threats for an enterprise network. In some embodiments, the production environment 703 may include a cloud computing platform for hosting a zero-trust network as a service (ZTNAaaS) platform.

Figure 8:
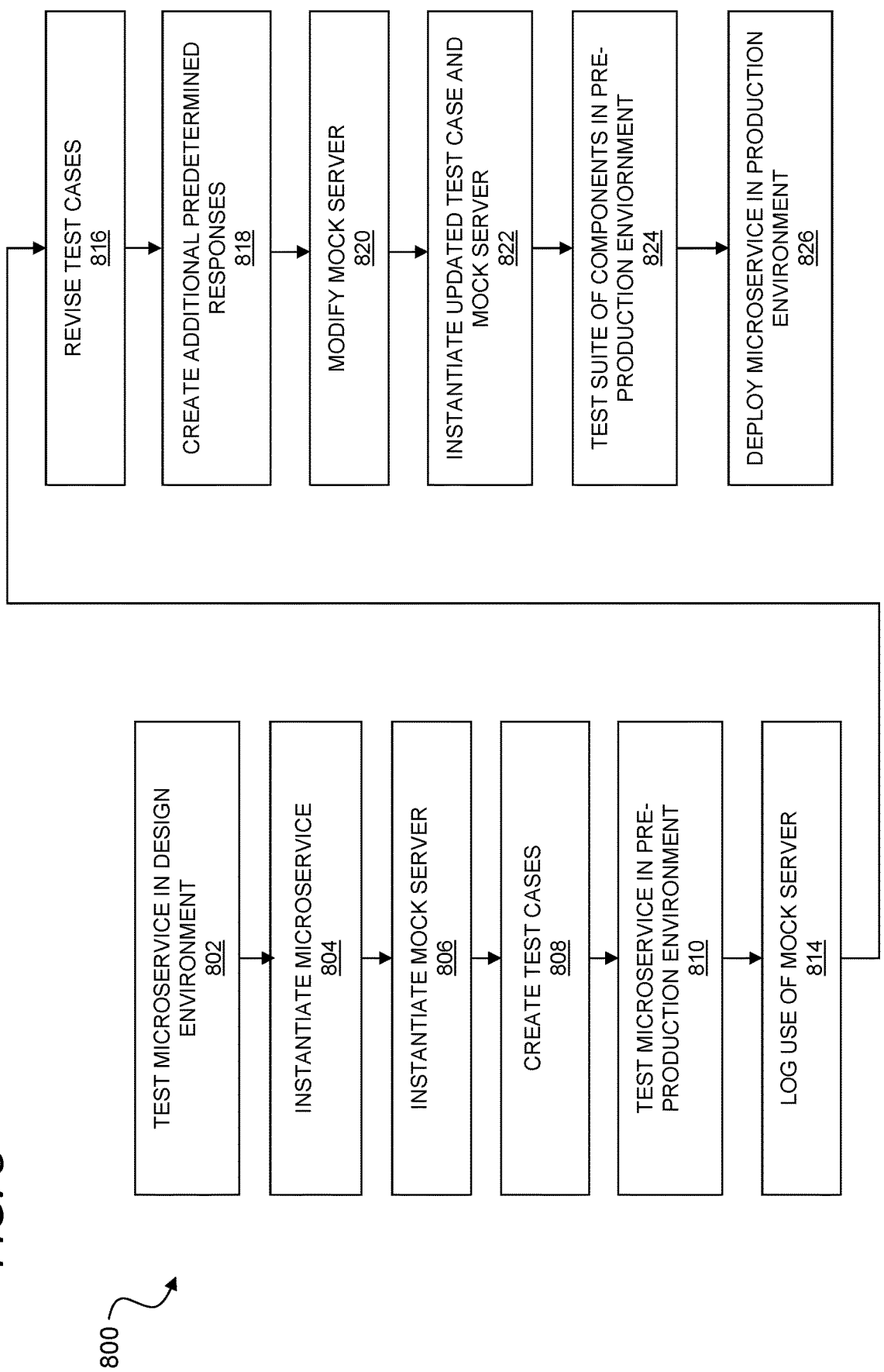
FIG. 8 shows a method for testing operation of a microservice in a pre-production environment.

FIG. 8 shows a method for testing operation of a microservice in a pre-production environment. In general, an enterprise application may be composed of one or more microservices in communication with each other. Each microservice of the enterprise application may be tested in the pre-production environment before being deployed for use. The operation of a microservice of the enterprise application can be tested with a mock server that mimics the operation of one or more other microservices (and other resources) in communication with the microservice. In this manner, testing of a microservice can be performed in a pre-production environment that emulates the full context of the enterprise application, without the need to fully create, test, and deploy every component of the enterprise application.

As shown in step 802, the method 800 may include testing a first microservice in a design environment. The first microservice may be a component of an enterprise application composed of one or more microservices. The design environment may be a computing environment where microservices are developed before being tested and deployed, such as the development platform 506 illustrated in FIG. 5. The design environment may include tools for unit testing and debugging the first microservice, including tools for executing the microservice in isolation and applying defined test cases to determine if the microservice is functioning correctly.

As shown in step 804, the method 800 may include instantiating the first microservice in a pre-production environment such as any of the pre-production environments described herein. After being developed within the design environment, the first microservice may be deployed in the pre-production environment. In a microservices architecture or the like for an enterprise application, the first microservice may communicate with one or more other microservices including a second microservice. For example, the first microservice may be configured to communicate with a second microservice via a defined framework such as REST, gRPC, RPC, SOAP, GraphQL, and the like. The pre-production environment may be a computing environment where microservices are tested before being deployed, such as the pre-production environment 503 shown in FIG. 5. In some embodiments, the pre-production environment may be a separate environment from the design environment. In some embodiments, the pre-production environment may include a cloud computing platform, such as a cloud computing platform that emulates, or that is configured in the same manner as, a production environment target for the enterprise application. In some embodiments, the pre-production environment may include a container orchestration service such as Kubernetes or K3s (i.e., a lightweight implementation of Kubernetes) for deploying a plurality of containerized computing objects as a network-accessible application. More generally, the pre-production environment may include a cloud computing platform, a distributed computing environment, a heterogenous (hardware and/or software) computing environment, or any combination of these. The pre-production environment may include a plurality of programming interfaces for configuring the pre-production environment, deploying microservices or other resources within the pre-production environment, logging activity in the pre-production environment, and so forth.

As shown in step 806, the method 800 may include instantiating a mock server for the second microservice in the pre-production environment. The mock server may be configured to mimic operation of the second microservice by providing a communication interface at a predetermined network address (e.g., an HTTP interface or the like) that responds deterministically with one or more predetermined responses to one or more predetermined requests in place of programming logic for the second microservice when deployed in the pre-production environment. The predetermined response may include any suitable response to a request by a microservice, such as response literals, templated responses, callbacks, and the like. The mock server may include one or more request matchers that match a predetermined request with a predetermined response. The request matchers may match a predetermined request based on any number of properties of the predetermined request, such as headers, cookies, path parameters, and query string parameters. The mock server may include one or more configuration fields for each predetermined response, such as how many times to return the predetermined response, when to expect the predetermined response, an identity number for the predetermined response, and a priority level for the predetermined response. The mock server may be represented in JSON, HTTP, XML, CSV, YAML, or any other suitable format or data object.

The second microservice may be any service that forms a part of an enterprise application, and that can be configured to communicate with the first microservice. In some embodiments, the second microservice may include a login service configured to validate user credentials, and the mock server may include a second one or more predetermined responses to a login request including at least an authorization response for a first set of predetermined login credentials and an authorization rejection for a second set of predetermined login credentials, or for any login credentials other than the predetermined login credentials. In some embodiments, the second microservice may include a gateway service configured to manage authentication of users for access to a web application for an enterprise network, and the mock server may include a second one or more predetermined responses to an authentication request including at least an authentication token for granting access to the web application. In some embodiments, the second microservice may include a database service configured to access a database, and the mock server may include a second one or more predetermined responses to a plurality of predetermined database queries. In some embodiments, the second microservice may include a threat management service (e.g., threat management facility 100 in FIG. 1) configured to manage threats to an enterprise network, and the mock server may provide at least one predetermined response to security services request. In some embodiments, the second microservice may include a configuration service for managing other services, and the mock server may include a second one or more predetermined responses to a configuration request including at least one or more configuration rules for a managed service. More generally, any one or more request/response pairs may be hosted by the mock server to imitate functions of microservices and/or other resources for an enterprise application.

It will be understood that, while step 806 is described as instantiating a mock server for a second microservice, the mock server may be configured to imitate any number of different microservices and/or other resources. Thus for example, the mock server may provide request/response pairs for dozens or hundreds of microservices, thus simplifying the testing environment for the first microservice during initial testing in the pre-production environment.

As shown in step 808, the method 800 may include creating one or more test cases for the first microservice in the pre-production environment. This may, for example, include a script or other code that can be executed in the pre-production environment to cause the first microservice to access the mock server with the one or more predetermined requests. Each test case may include one or more fields such as instructions for the first microservice, an expected behavior of the mock server, an identification number, and a description. For example, a test case may instruct the first microservice to send an authentication request to a mock server that mimics a gateway service, and the expected behavior may include receiving an authentication token from the mock server. The test script may be created by any suitable test framework for component testing, such as an automated test framework (e.g., Paloma, Selenium, Karate, etc.). In general, the test case(s) may be configured to cause the first microservice to use any number of other microservices and resources in the microservice architecture of the enterprise application, more specifically by presenting predetermined requests corresponding to pre-programmed, deterministic behaviors of the mock server.

As shown in step 810, the method 800 may include testing operation of the first microservice in the pre-production environment using the script or other executable to communicate one or more requests to the first microservice based on the test cases that invoke the one or more predetermined requests to the second microservice. Testing operation of the first microservice may occur as part of a continuous integration and delivery pipeline ("CI/CD") for an enterprise application, e.g., where a prior instance of the enterprise application has been deployed in production, and one or more microservices have been updated in a manner that requires new validation. The script may execute in the pre-production environment to instruct the first microservice to invoke the one or more predetermined requests. The mock server may receive the predetermined requests and attempt to match the requests with the corresponding predetermined responses. The mock server may then return the predetermined responses. If no match is found, the mock server may return an error response and/or close the connection with the first microservice. This may be an error in the microservice, or an oversight in configuring the mock server. But in either case, the request and response will be logged by the mock server for subsequent forensic analysis. In some embodiments, the pre-production environment may include a container orchestration platform (e.g., Kubernetes), and the test script may run as one or more Kubernetes jobs in the container orchestration platform.

In some embodiments, testing operation of the first microservice may include monitoring the pre-production environment for receipt of the one or more predetermined responses by the first microservice. In general, a monitoring tool in the pre-production environment may monitor any service executing in the pre-production environment, such as the first microservice and the mock server. The monitoring tool may be a component of the automated test framework. In some embodiments, the monitoring tool may receive or otherwise detect the one or more predetermined responses after the mock server receives the predetermined requests. The predetermined responses may be compared with the expected behaviors of the test cases. If the predetermined responses match the expected behaviors, then the first microservice may be determined to have passed the test cases, or the test case may include additional expected actions by the first microservice, e.g., by returning a call to the microservice with an expected response based on the predetermined response from the mock server, or by initiating a subsequent, responsive request to another microservice, which may also or instead be emulated by the mock server (or a second mock server) in the pre-production testing environment. If the first microservice fails to generate an expected request to the mock server, fails to receive an expected response, or fails to take an expected, subsequent action, the first microservice may be determined to have failed the test cases. It is to be appreciated, however, that the expected behavior may include other alternate responses or actions, any of which may be alternatively defined by a design specification, a set of standards, or by any other suitable test description(s).

As shown in step 814, the method 800 may include logging use of the mock server with instrumentation deployed in the pre-production environment. A logging tool may log the internal state of any microservice or other resource within the pre-production environment, such as the mock server and the first microservice. The logging tool may output log reports such as web logs, console outputs, web reports, and XML outputs. In some embodiments, the logging tool may be part of a monitoring service that forms a component of the mock server, or may be an external tool that reports logging data and/or provides an interface for logging, debugging, and so forth, such as a component of an automated test framework. The logging tool may include a user interface to view the internal state of the monitored service, and/or a database that stores a log of activities based on logging rules or configuration. As an example, the logging tool may monitor the mock server by monitoring log events, received predetermined requests, and active predetermined responses. The logging tool may include debugging tools for debugging the monitored resources.

As shown in step 816, the method 800 may include revising the one or more test cases, thereby providing an updated test case. In some embodiments, the test cases may be revised in respond to updates to the first microservice and/or the second microservice, either to test new and previously unexpected use cases, or to address deficiencies or errors identified in previous use cases based on testing within the pre-production environment. Alternatively, the test cases may be revised to correspond to the operation of a third microservice that can be used with the first microservice.

As shown in step 818, the method 800 may include creating one or more additional predetermined responses to one or more additional predetermined requests based on the updated test case. The additional predetermined responses may correspond to an expected behavior of the updated test case.

As shown in step 820, the method 800 may include modifying the mock server to mimic operation of the second microservice based on the one or more additional predetermined requests and responses, thereby providing a modified mock server. The predetermined responses and the request matchers of the mock server may be modified to correspond to the additional predetermined requests and responses. The predetermined responses and the request matchers of the mock server may be modified through the user interface of the logging tool or any other suitable tool within the pre-production environment.

As shown in step 822, the method 800 may include instantiating the updated test case and the modified mock server in the pre-production environment. The operation of the first microservice may be tested within the pre-production environment with the updated test case and the modified mock server. The process of updating test cases, creating additional request/response pairs, and modifying the mock server, may be repeated as necessary to address changes to the design specification for the enterprise application, emergence of new functional issues or errors, changes in expected use cases, and so forth. Thus component testing for an individual microservice may be revised and updated as necessary or useful to facilitate proper function of the microservice in an enterprise application.

As shown in step 824, the method 800 may include testing a suite of microservices in the pre-production environment. While component testing with a mock server provides an excellent framework for controlled testing of individual microservices, it will still be generally useful to test the entire suite of microservices and other resources that form an enterprise application. This testing may be performed in the pre-production environment before instantiating the full enterprise application in a production environment where it will be accessible to users. The enterprise application, and individual components thereof, may be debugged if/as necessary based on testing of the full enterprise application in the pre-production environment.

As shown in step 826, the method 800 may include deploying the first microservice in a production environment. The production environment may be a computing environment where microservices are deployed to users, such as any of the production environments 504 described in reference to FIG. 5. In some embodiments, the production environment may be a separate environment from the design environment and/or the pre-production environment, and may have a web server or other network resource exposed to a data network for access by end users. The production environment may execute the first microservice as a component of an enterprise application. In one aspect, deploying the first microservice may include deploying an enterprise application that includes the first microservice. Deploying the first microservice may also or instead include updating the first microservice in a pre-existing instance of the enterprise application that has been previously deployed for end users in the production environment.

It will be understood that deploying an enterprise application or the like in the production environment may also include configuring network access to the enterprise application, e.g., by updating Internet Protocol ("IP") address information at a Domain Name Service, opening and forwarding ports for an IP address to suitably responsive resources within the production environment (so that a device requesting access to the enterprise application will be internally routed to the correct resource(s) within the production environment), and so forth.

In general, the enterprise application may be monitored during use in the production environment, and changes, updates, security patches, revisions, and so forth, may be tested before deployment using the techniques described herein.

Figure 9:
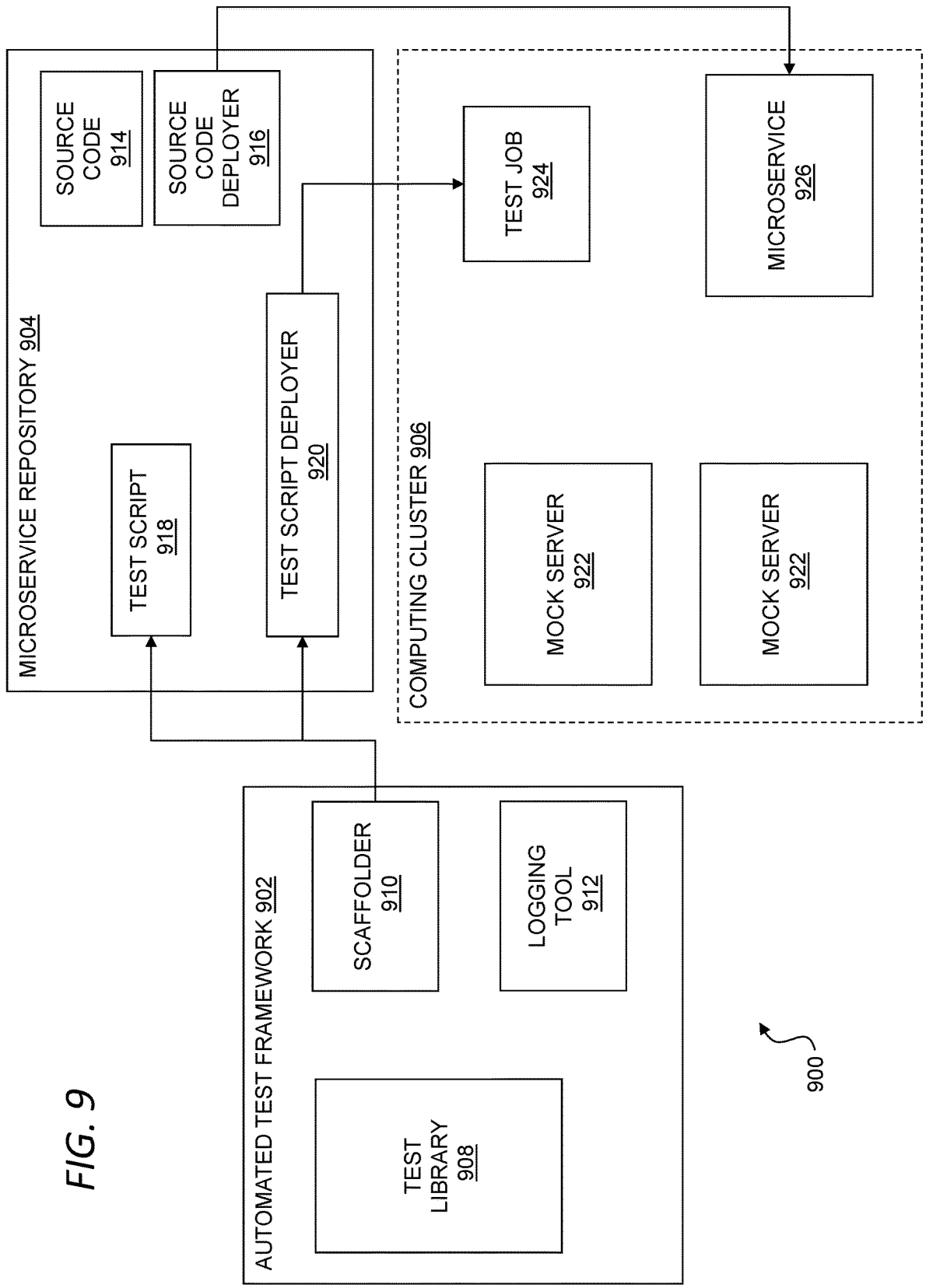
FIG. 9 illustrates an environment for deploying and testing a microservice.

FIG. 9 illustrates an environment for deploying and testing a microservice. The environment 900 may include a pre-production environment for testing microservices (e.g., pre-production environment 702 in FIG. 7). The environment 900 may include an automated test framework 902, a microservice repository 904, and a computing cluster 906. The automated test framework 902 may include any suitable collection of tools configured to set up an automated testing environment for the microservice, such as Paloma, Selenium, Karate, and the like. The automated test framework 902 may include open-source components and/or in-house components. The automated test framework 902 may include support for external libraries for modular flexibility. The automated test framework 902 may be configured to be used in distributed, heterogenous computing environments. The automated test framework 902 may implement one or more test case techniques, such as keyword-driven testing, behavior-driven testing, and data-driven testing.

In some embodiments, the automated test framework 902 may include a test library 908, a scaffolder 910, and a logging tool 912. The test library 908 may include a collection of test cases written as one or more scripts executable in the environment 900. In general, these test cases are configured to exercise features of components within, e.g., a microservice architecture, to ensure proper interoperation and integrated functioning as an enterprise application. The scaffolder 910 may be configured to generate one or more skeleton components for testing a microservice, such as programming interfaces, data structures, communication protocols, servers, microservices, applications, and the like. For example, the scaffolder 910 may generate an application programming interface for the microservice and one or more software components (e.g., other microservices, mock servers, etc.) within a defined framework (e.g., REST, gRPC, RPC, SOAP, GraphQL, etc.). The logging tool 912 may be configured to monitor the mock server and/or other services within the environment 900. The logging tool 912 may output log reports such as web logs, console outputs, web reports, and XML outputs. While FIG. 9 illustrates the logging tool 912 as being part the automated test framework, the logging tool 912 may also or instead be part of another service within the environment 900 (e.g., the mock server). The logging tool 912 may include a user interface to view the internal state of a service, such as the mock server. The logging tool 912 may include debugging tools for debugging the service.

The microservice repository 904 may be configured to store one or more files associated with microservices. The microservice repository 904 may include source code 914 for the microservice that controls functional operation of one or more microservices, along with supporting code such as a source code deployer 916, a test script 918, and a test script deployer 920 for one or more of the microservices. The test script 918 may include one or more test cases from the test library 908. The source code deployer 916 may include one or more configuration files for setting up the microservice. The test script deployer 920 may include one or more configuration files for setting up a testing environment for the microservice. The test script 918 and the test script deployer 920 may be set up by the scaffolder 910. The configuration files may be written in any suitable configuration language, such as XML, JSON, YAML, HCL, and the like. While the test script 918 and the test script deployer 920 are illustrated as being located at the microservice repository, the scaffolder 910 may set up the test script 918, the script deployer 920, and/or other components at an external repository.

The computing cluster 906 may include a cluster of computing instances for executing code. The computing cluster 906 may execute one or more mock servers 922, one or more test jobs 924, and a microservice 926 within the environment 900. The computing cluster 906 may execute the mock servers 922, the test jobs 924, and the microservice 926 with any suitable usage pattern, such as a helm chart for a Kubernetes environment, an application programming interface ("API"), a Node.js module, a Docker container, a command line, and the like. The source code deployer 916 may deploy the microservice 926 based on the source code 914, and the test script deployer 920 may deploy the test jobs 924 based on the test script 918.

In some embodiments, the computing cluster 906 may be managed, e.g., remotely through a console or the like, using a container orchestration platform such as Kubernetes or K3s, or any other operating system or environment suitable for managing computing resources in a scalable deployment. In a container orchestration platform, each managed device may include a container orchestration service that acts as an agent for coupling the computing instances of the computing cluster 906 together.

In general, to test the microservice 926 within the environment 900, the test scripts 918 may execute at the computing cluster 906 and cause the microservice 926 to access the mock servers 922 with one or more predetermined requests. The mock servers 922 may receive the predetermined requests and attempt to match the requests with one or more predetermined responses. The mock servers 922 may return the matching predetermined responses to the automated test framework 902. The automated test framework 902 may compare the predetermined responses to one or more expected behaviors of the test cases. If the predetermined responses match the expected behaviors, then the microservice 918 may be determined to have passed the test cases. Otherwise, the microservice 918 may be determined to have failed the test cases, and any suitable remedial actions may be taken in the design environment for an enterprise application or other application or resource being tested.

Figure 10:
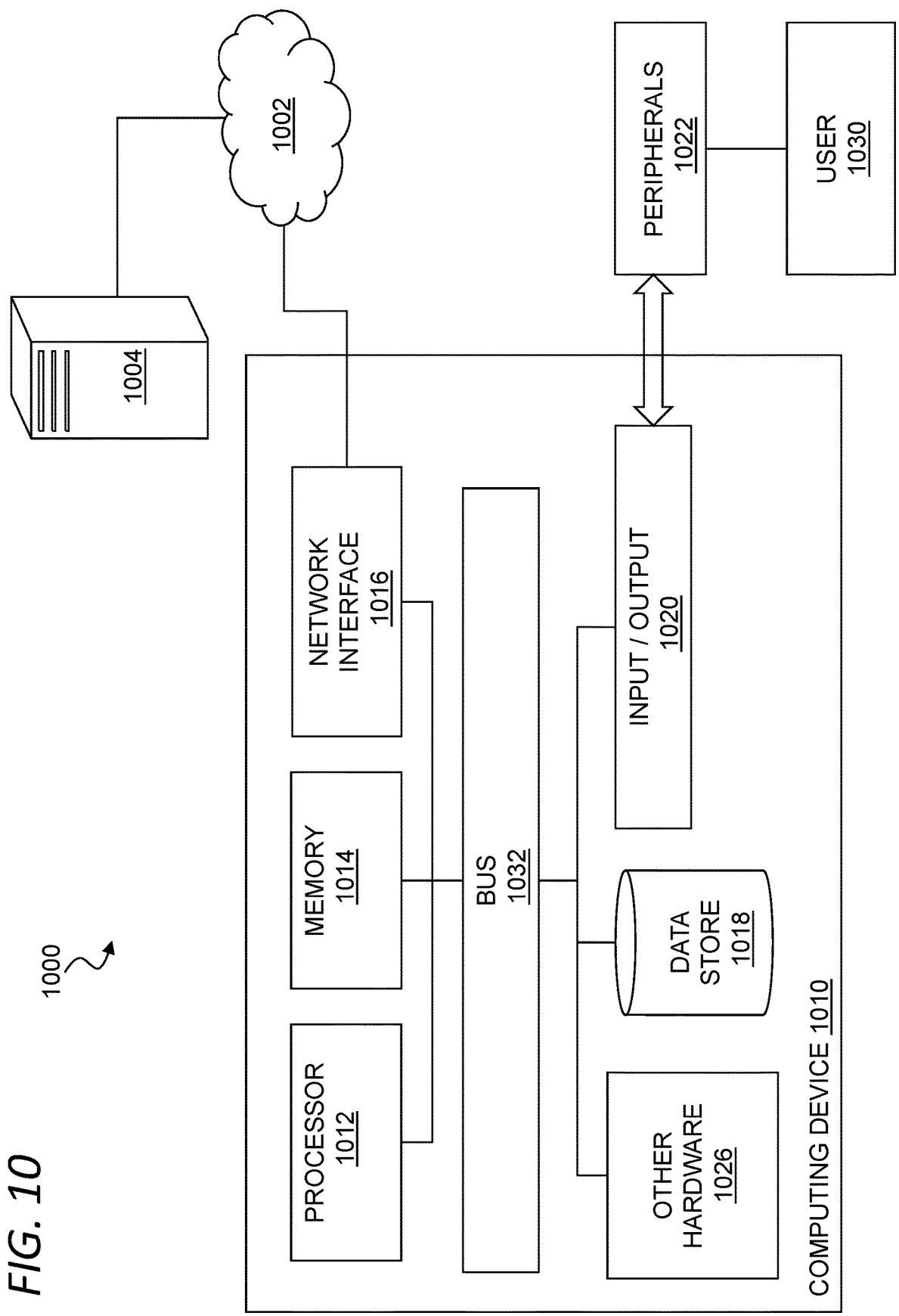
FIG. 10 illustrates a block diagram of a computer system.

FIG. 10 illustrates a block diagram of a computer system. Each of the devices or combination of devices described herein may be deployed on one or more physical computers, one or more virtual computers, or some combination thereof. FIG. 10 illustrates an example arrangement of hardware suitable for providing the corresponding computing resources for embodying these systems and any methods deployed thereon (e.g., method 800 in FIG. 8). In general, the computer system 1000 may include a computing device 1010 connected to a network 1002, e.g., through an external device 1004. The computing device 1010 may be or may include any type of network device, network endpoint, or other computing device or the like as described herein, e.g., any of the computing entities shown and described above. For example, the computing device 1010 may include a desktop computer workstation. The computing device 1010 may also or instead be any suitable end user device that has a processor and communicates over a network 1002, including without limitation a laptop computer, a desktop computer, a personal digital assistant, a tablet, a mobile phone, a television, a set top box, a wearable computer, a home device (e.g., a thermostat or a home appliance controller), and so forth. The computing device 1010 may also or instead include a network device such as a firewall, a gateway, a switch, a router, an access point, and so forth. The computing device 1010 may also or instead include a server or other device providing services to remote devices through a data network.

The computing device 1010 may be used for any of the entities described in the environment 100 described above with reference to FIG. 1. For example, the computing device 1010 be a server hosting the security operations platform 106, a server hosting the cloud computing deployment 116 of the enterprise solution, or any other virtual or physical device in the on-premises deployment 114 of an enterprise solution, or any of the other facilities or computing devices described herein. In certain aspects, the computing device 1010 may be implemented using hardware or a combination of software and hardware, and the computing device 1010 may be a standalone device, a device integrated into another entity or device, a platform distributed across multiple entities, or a virtualized device executing in a virtualization environment.

The network 1002 may include any network described above, e.g., data network(s) or internetwork(s) suitable for communicating data and control information among participants in the computer system 1000. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMAX-Advanced (IEEE 802.16m) and/or other technologies, as well as any of a variety of corporate area, metropolitan area, campus or other local area networks or enterprise networks, along with any switches, routers, hubs, gateways, and the like that might be used to carry data among participants in the computer system 1000. The network 1002 may also include a combination of data networks, and need not be limited to a strictly public or private network.

The external device 1004 may be any computer or other remote resource that connects to the computing device 1010 through the network 1002. This may include threat management resources such as any of those contemplated above, gateways or other network devices, remote servers or the like containing content requested by the computing device 1010, a network storage device or resource, a device hosting malicious content, or any other resource or device that might connect to the computing device 1010 through the network 1002.

The computing device 1010 may include a processor 1012, a memory 1014, a network interface 1016, a data store 1018, and one or more input/output devices 1020. The computing device 1010 may further include or be in communication with peripherals 1022 and other external input/output devices 1024.

The processor 1012 may be any processor(s) and/or processing circuitry suitable for providing computing resources as contemplated herein, and may in general be capable of processing instructions for execution within the computing device 1010 or computer system 1000. The processor 1012 may include a single-core processor, a multi-core processor, a graphics processing unit, or any other type of processor or processing circuitry. The processor 1012 may be capable of processing instructions stored in the memory 1014 or on the data store 1018.

The memory 1014 may store information within the computing device 1010 or computer system 1000. The memory 1014 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 1014 may store program instructions, program data, executables, and other software and data useful for controlling operation of the computing device 1000 and configuring the computing device 1000 to perform functions for a user. The memory 1014 may include a number of different stages and types for different aspects of operation of the computing device 1010. For example, a processor may include on-board memory and/or cache for faster access to certain data or instructions, and a separate, main memory or the like may be included to expand memory capacity as desired.

The memory 1014 may, in general, include a non-volatile computer readable medium containing computer code that, when executed by the computing device 1000 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 1014 is depicted, it will be understood that any number of memories may be usefully incorporated into the computing device 1010. For example, a first memory may provide non-volatile storage such as a disk drive for permanent or long-term storage of files and code even when the computing device 1010 is powered down. A second memory such as a random-access memory may provide volatile (but higher speed) memory for storing instructions and data for executing processes. A third memory may be used to improve performance by providing even higher speed memory physically adjacent to the processor 1012 for registers, caching and so forth.

The network interface 1016 may include any hardware and/or software for connecting the computing device 1010 in a communicating relationship with other resources through the network 1002. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 1010 and other devices. The network interface 1016 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 1016 may include any combination of hardware and software suitable for coupling the components of the computing device 1010 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 1002 such as the Internet. This may also or instead include hardware/software for a WiMAX connection or a cellular network connection (using, e.g., CDMA, GSM, LTE, or any other suitable protocol or combination of protocols). The network interface 1016 may be included as part of the input/output devices 1020 or vice-versa.

The data store 1018 may be any internal memory store providing a computer-readable medium such as a disk drive, an optical drive, a magnetic drive, a flash drive, or other device capable of providing mass storage for the computing device 1010. The data store 1018 may store computer readable instructions, data structures, program modules, and other data for the computing device 1010 or computer system 1000 in a non-volatile form for subsequent retrieval and use. For example, the data store 1018 may store without limitation one or more of the operating system, application programs, program data, databases, files, and other program modules or other software objects and the like.

The input/output interface 1020 may support input from and output to other devices that might couple to the computing device 1010. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 1016 for network communications is described separately from the input/output interface 1020 for local device communications, these two interfaces may be the same, or may share functionality, such as where a USB port is used to attach to a WiFi accessory, or where an Ethernet connection is used to couple to a local network attached storage.

A peripheral 1022 may include any device used to provide information to or receive information from the computing device 1000. This may include human input/output (I/O) devices such as a keyboard, a mouse, a mouse pad, a track ball, a joystick, a microphone, a foot pedal, a camera, a touch screen, a scanner, or other device that might be employed by the user 1030 to provide input to the computing device 1010. This may also or instead include a display, a speaker, a printer, a projector, a headset or any other audiovisual device for presenting information to a user. The peripheral 1022 may also or instead include a digital signal processing device, an actuator, or other device to support control or communication to other devices or components. Other I/O devices suitable for use as a peripheral 1022 include haptic devices, three-dimensional rendering systems, augmented-reality displays, and so forth. In one aspect, the peripheral 1022 may serve as the network interface 1016, such as with a USB device configured to provide communications via short range (e.g., Bluetooth, WiFi, Infrared, RF, or the like) or long range (e.g., cellular data or WiMAX) communications protocols. In another aspect, the peripheral 1022 may provide a device to augment operation of the computing device 1010, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 1000 may be used as a peripheral 1022 as contemplated herein.

Other hardware 1026 may be incorporated into the computing device 1000 such as a co-processor, a digital signal processing system, a math co-processor, a graphics engine, a video driver, and so forth. The other hardware 1026 may also or instead include expanded input/output ports, extra memory, additional drives (e.g., a DVD drive or other accessory), and so forth.

A bus 1032 or combination of busses may serve as an electromechanical platform for interconnecting components of the computing device 1000 such as the processor 1012, memory 1014, network interface 1016, other hardware 1026, data store 1018, and input/output interface. As shown in the figure, each of the components of the computing device 1010 may be interconnected using a system bus 1032 or other communication mechanism for communicating information.

Methods and systems described herein can be realized using the processor 1012 of the computer system 1000 to execute one or more sequences of instructions contained in the memory 1014 to perform predetermined tasks. In embodiments, the computing device 1000 may be deployed as a number of parallel processors synchronized to execute code together for improved performance, or the computing device 1000 may be realized in a virtualized environment where software on a hypervisor or other virtualization management facility emulates components of the computing device 1000 as appropriate to reproduce some or all of the functions of a hardware instantiation of the computing device 1000.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer readable medium that, when executing on one or more computing devices, performs the steps of:
   instantiating a first microservice in a pre-production environment, the first microservice configured for use with a second microservice in the pre-production environment, the pre-production environment including a cloud computing platform;
   instantiating a mock server for the second microservice in the pre-production environment, the mock server configured to mimic operation of one or more microservices including the second microservice by providing one or more predetermined responses to one or more predetermined requests in place of programming logic for the second microservice when deployed in the pre-production environment, wherein the mock server replaces a dependency on access to an external resource used by the second microservice and modeled by a resource external to the mock server with a static catalog of requests and responses stored by the mock server with no dependencies on other microservices;
   creating one or more test cases as a script executable in the pre-production environment to cause the first microservice to access the mock server with the one or more predetermined requests;
   testing operation of the first microservice in the pre-production environment using the script to communicate one or more requests to the first microservice based on the one or more test cases that invoke the one or more predetermined requests to the second microservice causing the mock server for the second microservice to replace the dependency on access to the external resource used by the second microservice with at least one of the responses in the static catalog of requests and responses stored by the mock server;
   monitoring the pre-production environment for receipt of the one or more predetermined responses by the first microservice; and
   deploying the first microservice and the second microservice in a production environment.

2. The computer program product of claim 1, wherein the pre-production environment includes a container orchestration service for deploying a plurality of containerized computing objects as a network-accessible application.

3. The computer program product of claim 1, wherein the second microservice includes a login service configured to validate user credentials, and wherein the mock server includes a second one or more predetermined responses to a login request including at least an authorization response for predetermined login credentials and an authorization rejection for login credentials other than the predetermined login credentials.

4. A method for testing components in a deployment context, the method comprising:
   instantiating executable code for a first microservice in a pre-production environment, the first microservice configured for use with a second microservice in the pre-production environment;
   instantiating a mock server for the second microservice in the pre-production environment, the mock server configured to mimic operation of one or more microservices including the second microservice by providing one or more predetermined responses to one or more predetermined requests in place of programming logic for the second microservice when deployed in the pre-production environment, wherein the mock server replaces a dependency on access to an external resource used by the second microservice and modeled by a resource external to the mock server with a static catalog of requests and responses stored by the mock server with no dependencies on other microservices;
   testing operation of the first microservice using one or more requests to the first microservice that invoke the one or more predetermined requests to the second microservice causing the mock server for the second microservice to replace the dependency on access to the external resource used by the second microservice with at least one of the responses in the static catalog of requests and responses stored by the mock server; and
   monitoring the pre-production environment for receipt of the one or more predetermined responses from the mock server by the first microservice.

5. The method of claim 4, wherein the pre-production environment includes a heterogenous computing environment.

6. The method of claim 4, wherein the pre-production environment includes a distributed computing environment.

7. The method of claim 4, wherein the pre-production environment includes a cloud computing platform.

8. The method of claim 4, wherein the pre-production environment includes a plurality of programming interfaces.

9. The method of claim 4, wherein the pre-production environment includes a container orchestration service for deploying a plurality of containerized computing objects as a network-accessible application.

10. The method of claim 9, wherein the container orchestration service uses a lightweight implementation of Kubernetes as a container orchestration platform.

11. The method of claim 4, wherein the second microservice includes a login service configured to validate user credentials, and wherein the mock server includes a second one or more predetermined responses to a login request including at least an authorization response for predetermined login credentials and an authorization rejection for login credentials other than the predetermined login credentials.

12. The method of claim 4, wherein the second microservice includes a gateway service configured to manage authentication of users for access to a web application for an enterprise network, and wherein the mock server includes a second one or more predetermined responses to an authentication request including at least an authentication token for granting access to the web application.

13. The method of claim 4, wherein the second microservice includes a database service configured to access a database, and wherein the mock server includes a second one or more predetermined responses to a plurality of predetermined database queries.

14. The method of claim 4, wherein the second microservice includes a threat management service configured to manage threats to an enterprise network, and wherein the mock server provides at least one predetermined response to security services request.

15. The method of claim 4, further comprising:
creating one or more test cases that cause the first microservice to access the mock server with the predetermined requests; and
instantiating the one or more test cases in the pre-production environment as a script executable in the pre-production environment to present the one or more requests to the first microservice that invoke the one or more predetermined requests from the first microservice to the second microservice.

16. The method of claim 15, further including:
revising the one or more test cases, thereby providing an updated test case;
creating one or more additional predetermined responses to one or more additional predetermined requests based on the updated test case;
modifying the mock server to mimic operation of the second microservice based on the one or more additional predetermined requests and responses, thereby providing a modified mock server; and
instantiating the updated test case and the modified mock server in the pre-production environment.

17. The method of claim 4, further including logging use of the mock server with instrumentation deployed in the pre-production environment.

18. A system comprising:
a computing platform, the computing platform configured to execute a microservice and one or more mock servers in a pre-production environment, wherein:
the microservice is configured for use with one or more additional microservices in the pre-production environment as an application,
the one or more mock servers are configured to mimic operations of the one or more additional microservices by providing predetermined responses to predetermined requests in place of programming logic for the one or more additional microservices when executing in the pre-production environment, wherein the one or more mock servers replace a dependency on access to an external resource used by the one or more additional microservices and modeled by a resource external to the one or more mock servers with a static catalog of requests and responses stored by the one or more mock servers with no dependencies on other microservices, and
the computing platform is configured to:
receive executable code for the microservice and the one or more mock servers from a remote integrated design environment,
execute the executable code for the microservice and the one or more mock servers for the one or more additional microservices in the pre-production environment, and
test operation of the microservice using at least one test case that causes the microservice to initiate one or more of the predetermined requests to the one or more additional microservices causing the one or more mock servers for the one or more additional microservices to replace the dependency on access to the external resource used by the one or more additional microservices with at least one of the responses in the static catalog of requests and responses stored by the one or more mock servers.

19. The system of claim 18, wherein the computing platform is a cluster of computing instances.

20. The system of claim 19, wherein each computing instance is a virtual computing instance.

* * * * *